United States Patent [19]

Marino

[11] Patent Number: 4,775,021
[45] Date of Patent: Oct. 4, 1988

[54] AUTOMOTIVE VEHICLE HAVING FOUR WHEELS IN A RHOMBOIDAL CONFIGURATION

[76] Inventor: Silvio Marino, Via Debbio n. 108, 19020 Bolano (SP), Italy

[21] Appl. No.: 76,357

[22] Filed: Jul. 22, 1987

[30] Foreign Application Priority Data

Jul. 30, 1986 [IT] Italy .................. 16708 A/86

[51] Int. Cl.⁴ .................................. B62D 61/00
[52] U.S. Cl. ........................... 180/21; 180/253
[58] Field of Search .............. 180/21, 252, 253, 906

[56] References Cited

U.S. PATENT DOCUMENTS

| | | | |
|---|---|---|---|
| 1,426,975 | 8/1922 | Fuscaldo | 180/21 |
| 2,076,722 | 4/1937 | Heinze | 180/21 |
| 2,111,983 | 3/1938 | Massey | 180/21 |
| 2,533,752 | 12/1950 | Alamagny | 180/21 |
| 2,548,749 | 4/1951 | Stout | 280/270 |
| 2,592,893 | 4/1952 | Hansen | 180/73.1 |
| 2,641,480 | 6/1953 | Bancroft | 180/21 |
| 3,656,572 | 4/1972 | Mercier | 180/21 |
| 4,041,678 | 8/1977 | Chaney et al. | 180/21 |
| 4,063,611 | 12/1977 | Anderson | 180/21 |
| 4,630,701 | 12/1986 | Venetsoki | 180/906 |

FOREIGN PATENT DOCUMENTS

| | | |
|---|---|---|
| 573653 | 6/1924 | France . |
| 927521 | 10/1947 | France . |
| 1378894 | 10/1964 | France . |

*Primary Examiner*—Kenneth R. Rice
*Attorney, Agent, or Firm*—Jacobs & Jacobs

[57] ABSTRACT

An automotive vehicle with rhomboidal configuration includes a bearing frame or chassis (1), a central driving system (10), trapezoidal oscillating suspensions (7) for the central wheels (2, 3), and L-shaped floating arm type suspensions (8) for front (4) and rear (5) wheels.

All four wheels (2, 3, 4, 5) are driving wheels, the front (4) and rear (5) wheels both being steered by one single gearbox (14). Steering of the wheels (4, 5) will be through a knuckle (9) mounted on a floating arm (8), whereas the steering rod (18) is mounted on the extension of the bearing shaft (34) on which the wheels are mounted.

7 Claims, 6 Drawing Sheets

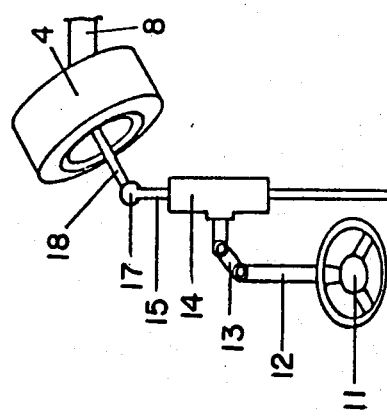
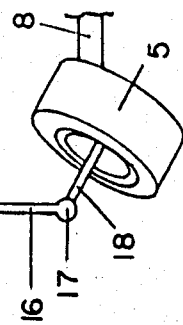
FIG. 5
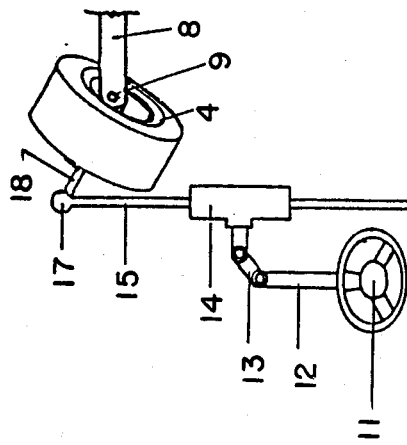
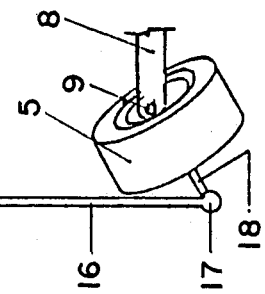
FIG. 4

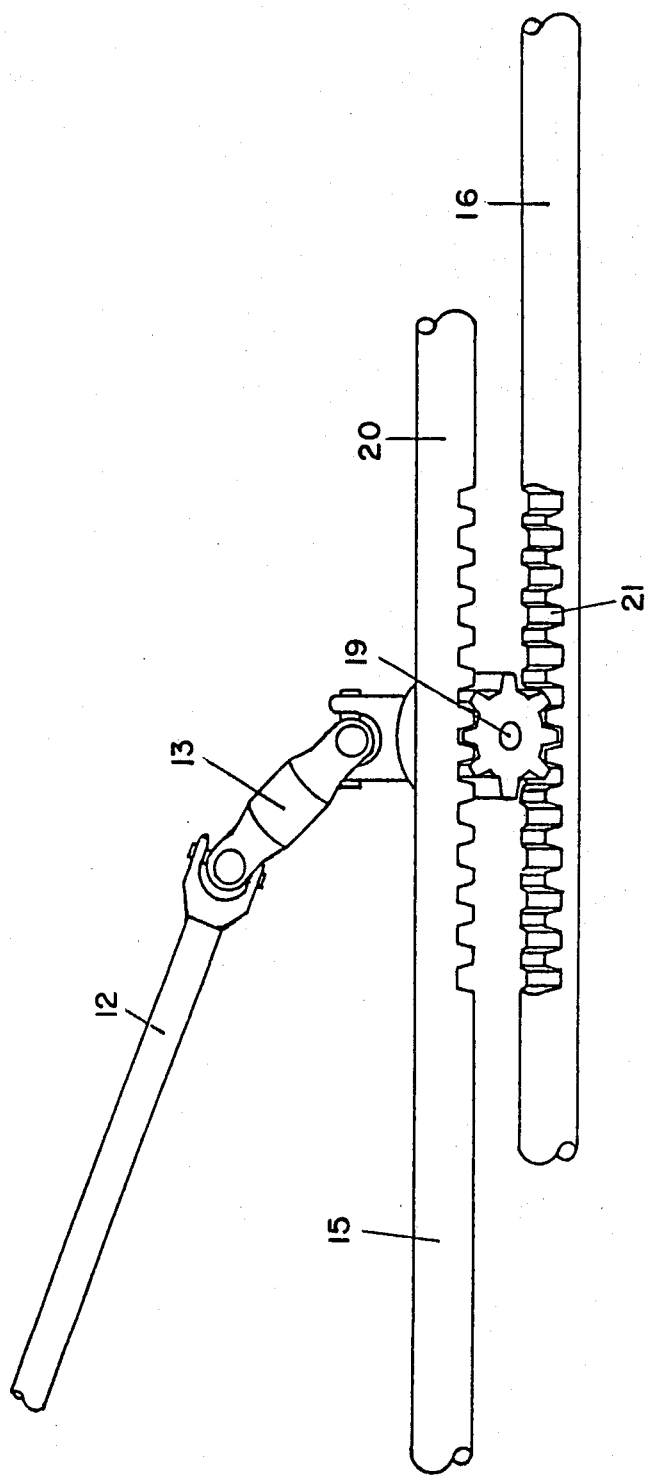

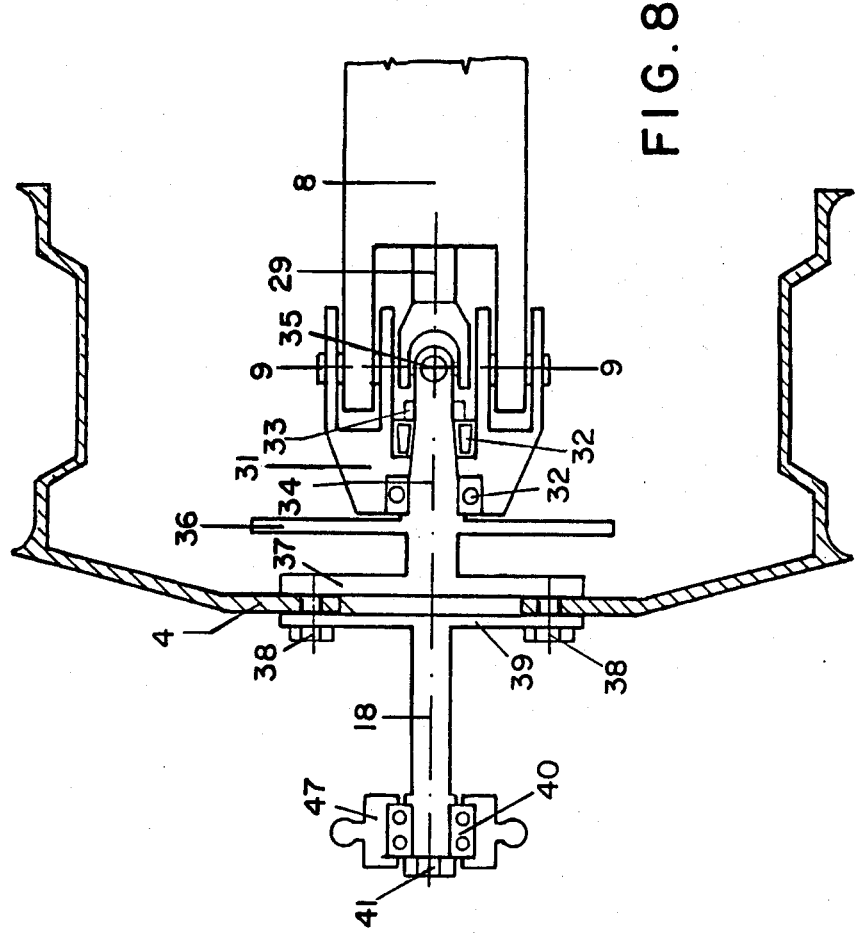

AUTOMOTIVE VEHICLE HAVING FOUR WHEELS IN A RHOMBOIDAL CONFIGURATION

BACKGROUND OF THE INVENTION

Four-wheeled automotive vehicles in which the wheels form a right angled quadrilateral and are located at the ends of front and rear wheel axles, the vehicles being provided with front steering wheels, are generally known.

This solution, in which the four wheels have a quadrilateral configuration, has reached optimum performance and no further significant improvements or better roadability can be achieved.

This invention advances progress by positioning the four wheels in a rhomboidal configuration. This configuration enormously increases the roadability of these cars especially in the curves, since in a quadrilateral configuration, the car is only acting on the two external wheels, whereas in a rhomboidal wheel configuration, road resistance is supported at least by three wheels.

An automotive vehicle having a rhomboidal wheel configuration was already proposed as far back as 1913, but results were unsatisfactory because of numerous drawbacks. First of all, the center of gravity of the vehicle was not centralized so that differential forces were acting on the wheels. A second disadvantage was that only the front wheel was steering, which easily led to skidding in curves also involving strong wear of the tires.

Then there was the fact that only the central wheels were driving, since at that time integral four-wheel drive for private and race cars was still quite unknown. A similar car was introduced in 1960, but with its wheels in Y-configuration.

This car too had no further development since it had almost the same disadvantage as its ancestor.

SUMMARY OF THE INVENTION

The automotive vehicle according to this invention practically eliminates all the above mentioned drawbacks while offering several structural and functional advantages, thus making the adoption of the rhomboidal wheel configuration highly attractive.

Generally speaking, the automotive vehicle of this invention has the following characteristics:
one single chassis or bearing frame;
center of gravity of the car virtually located in the center of the frame;
self-aligning trapezoidal suspension of the central wheels;
L-shaped floating arm suspensions on the front and rear wheels;
all four wheels are driving wheels;
front and rear wheels are steering on articulated joints mounted on L-shaped floating suspensions; and
gear-box consisting of a rack and pinion gear with external wheel drive, i.e. in opposite position with respect to the bearing shaft.

These technical particulars and others which will be described hereinafter, will make these automotive vehicles with rhomboidal wheel configuration perfectly efficient and competitive as compared with other cars having a rectangular wheel configuration.

BRIEF DESCRIPTION OF THE DRAWINGS

The invention in question is illustrated, in its practical implementation, in the attached drawings in which:

FIGS. 4 and 5 are illustrating the steering gear acting contemporaneously on the front and rear wheels;

FIG. 6 shows a perspective view of the steering gear housing;

FIG. 8 shows a side view of the fastening and steering mechanisms of a steering wheel.

DETAILED DESCRIPTION OF THE PREFERRED EMBODIMENT

Figure 1:
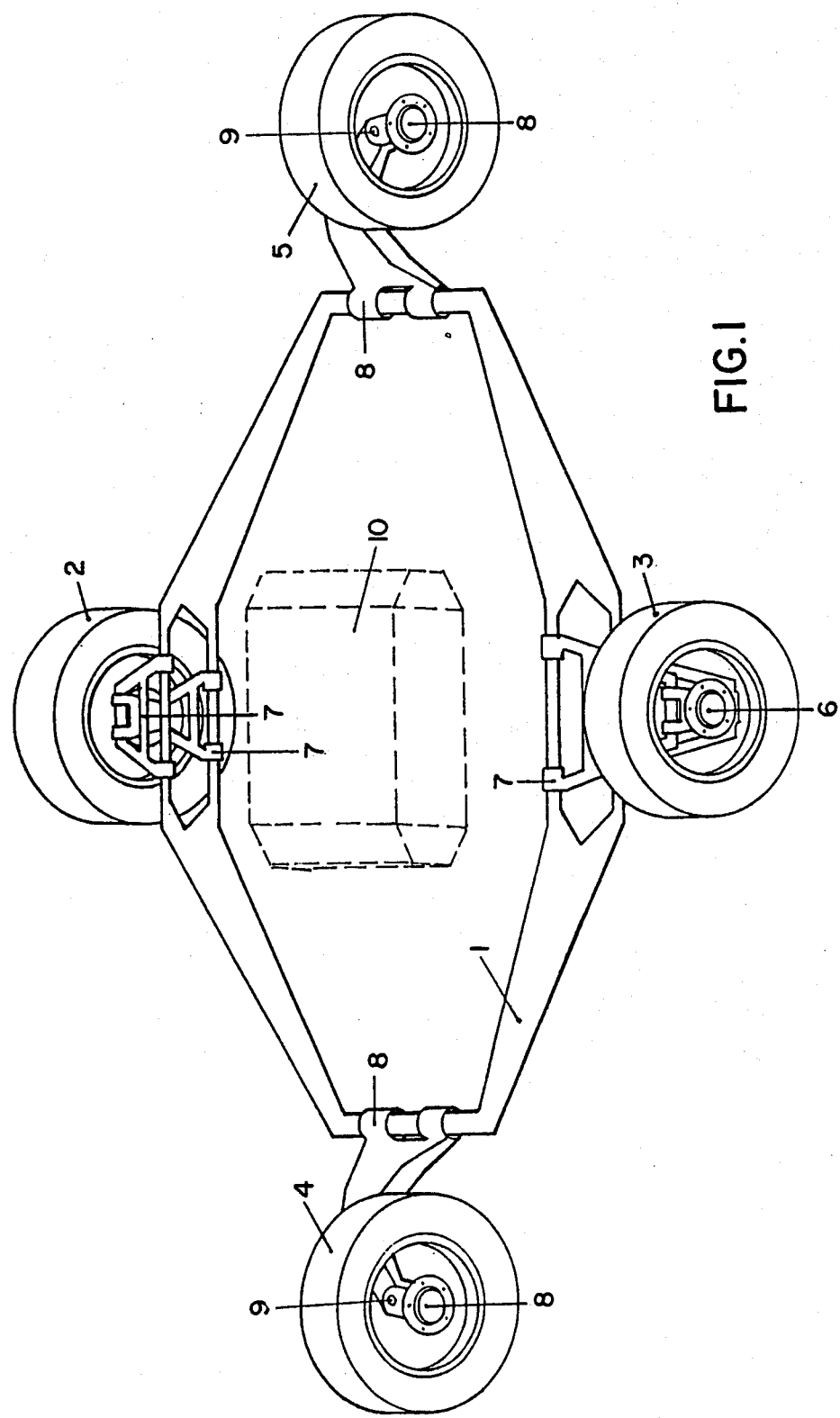
FIG. 1 shows a perspective view of the bearing frame or chassis and of the wheels mounted in rhomboidal configuration.
Figure 2:
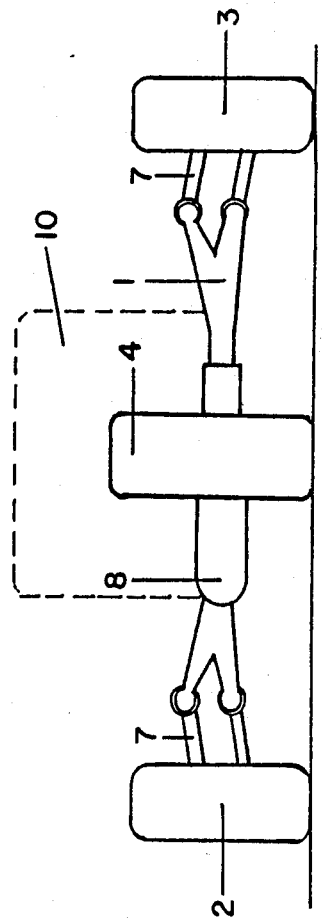
FIGS. 2 and 3 are respectively showing a front and rear view of the assembly illustrated in FIG. 1.
Figure 3:
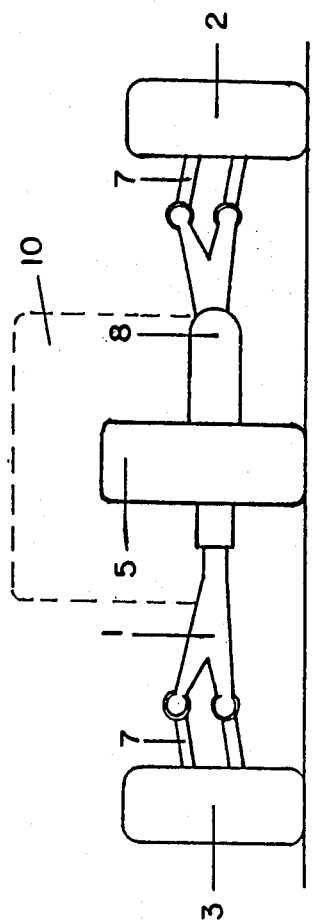

With reference to FIGS. 1-3, the bearing frame or chassis 1 has a rhomboid configuration, on which the central wheels 2 and 3 as well as the front and rear steering wheels 4 and 5 are mounted. The central wheels 2 and 3 are supported along a center axis 6 by self-aligning trapezoidal suspensions 7, whereas the front 4 and rear 5 wheel are supported along a horizontal axis by L-shaped floating arm type suspensions 8 fitted with a vertical pin 9 providing for steering of the wheels 4 and 5. The engine 10 is located in the central part of the chassis so that the center of gravity is located as centrally as possible with respect to the rhombus formed by the chassis and by the wheels 2, 3, 4 and 5.

FIGS. 4 and 5 show that both front 4 and rear wheels 5 are castoring in opposite directions.

When acting on the steering wheel 11, the gear box or drive case 14 is controlled through the steering column 12 and the double joint 13, while the drive case is acting at the same time on the wheels through the rods 15 and 16 connected by their ball joints 17.

These ball and socket joints 17 are linked up to the outer end of a rotating rod 18, fastened on the outside of the wheel in opposite position with respect to the steering pin 9.

FIGS. 4 and 5 respectively show the left and right steering. The drive case 14 also houses a pinion 19 and two opposed racks 20, 21 respectively connected to the steering control rods 15 and 16 as shown in FIG. 6. The pinion 19 is driven by the steering wheel 11, by means of the steering column 12 and the double joint 13.

This solution permits at the same time steering of both wheels 4,5 in opposite directions around the pins 9.

Figure 7:
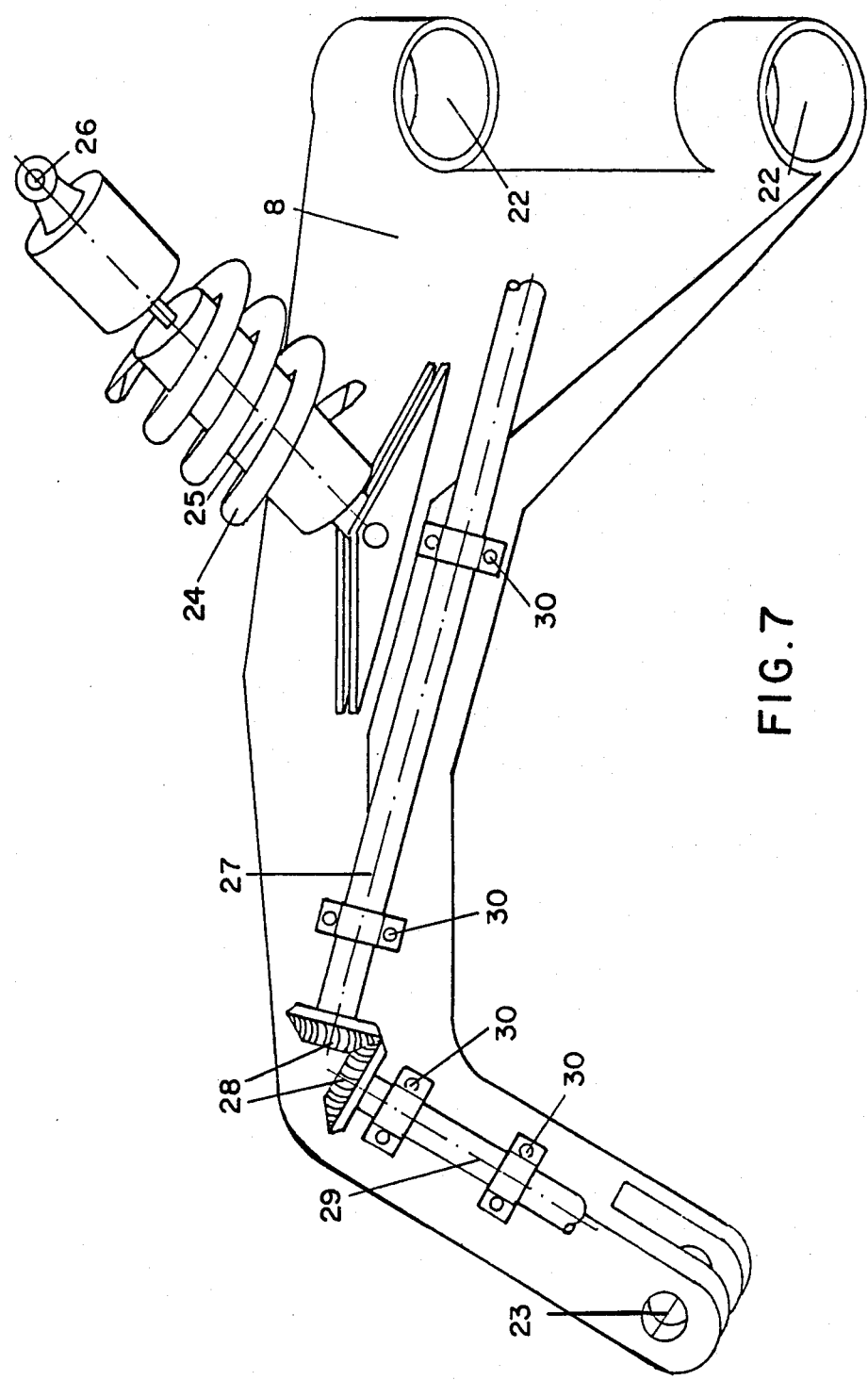
FIG. 7 shows a perspective view of the L-shaped floating arm of the castoring wheels.

The floating arm 8 of the steering wheels 4 and 5 is shown in greater detail in FIG. 7. This floating arm 8 is L-shaped and has at one end articulation eyelets 22 extending along a horizontal axis and hinged on the chassis 1 and on its other end holes 23 extending along a vertical axis in which to accommodate the steering pin 9.

Any and all movements of this floating arm due to uneveness of the road are compensated by a large-sized spring 24 and damper 25, located between the arm 8 and a fixed point 26 of the bearing frame or chassis.

The mechanical transmission systems 27, 28, 29 are mounted on bearings 30 and they transmit the drive from the engine to the steering wheels 4 and 5.

FIG. 8 shows the arrangement of the steering wheels 4, 5 on their supporting floating arms 8. A support 31 is linked up to this floating arm 8 by means of two knuckle joints 9, usually secured by two pins. This support 31 for a driving shaft 34, complete with bearings 32 and register 33, is actuated by a universal joint 35, by the driving shaft 29. A brake disk 36 and a flange 37 fastened with bolts 38 on to the rim of wheel 4 are mounted on the revolving shaft 34. A second flange 39 is secured with the same bolts 38 on the outer surface of the rim. This second flange 39 is bearing a steering rod 18, one end of which is fitted with the double-ball joint 17, complete with bearing 40, kept in place by a bolt 41. This bearing 40 permits the revolving rod 18 to be connected to the non-rotating steering rods 15, 16.

The system described in this invention can also be suitably applied to toys and in particular to car modelcraft, now used to reproduce on a small scale the construction particulars and functions of series-built automotive vehicles and race cars.

I claim:

1. An automotive vehicle, comprising:
    a frame having a longitudinal axis extending along the direction of forward advancement of the vehicle, and a transverse axis extending transversely of the longitudinal axis, said frame being generally symmetrical about said axes;
    means for mounting a front wheel and a rear wheel on the frame in alignment along the longitudinal axis, including individual front and rear wheel suspensions;
    means for mounting a pair of side wheels mounted on the frame in alignment along the transverse axis, including individual side wheel suspensions;
    drive means mounted centrally of the frame for generating motive power;
    transmission means operatively connected between the drive means and the wheels, for rotatably driving each of the wheels, said transmission means including transmission components supportably mounted on the front and rear wheel suspensions; and
    steering means mounted on the frame and operatively connected to both the front and the rear wheels, for simultaneously affirmatively steering both the front and the rear wheels in opposite circumferential directions about respective vertical steering axes extending generally perpendicular to the longitudinal and transverse axes of the frame.

2. The vehicle as recited in claim 1, wherein the frame has longitudinally-extending side frame elements on which the side wheel suspensions are pivotably mounted, and transversely-extending end frame elements on which the front and rear wheel suspensions are pivotably mounted.

3. The vehicle as recited in claim 2, wherein each suspension has bearing sleeves in which a respective frame element is journaled.

4. The vehicle as recited in claim 2, wherein both mounting means position the wheels at the corners of a rhombus.

5. The vehicle as recited in claim 1, wherein each front and rear wheel suspension has an L-shaped configuration with a longer arm and a shorter arm; and wherein the transmission components include a longer drive rod mounted for turning movement on the longer arm, and a shorter drive rod mounted for turning movement on the shorter arm; and wherein the longer drive rod meshingly engages the shorter drive rod.

6. The vehicle as recited in claim 1, wherein the steering means includes a steering wheel manually turnable in opposite circumferential directions; a pinion; a steering column having one end operatively connected to the steering wheel, and another end operatively connected to the pinion; a pair of toothed elongated racks in meshing engagement with the pinion and movable in opposite directions lengthwise of the racks upon turning of the steering wheel in either one of said circumferential directions thereof; a vertical pin extending along each vertical steering axis; and means for converting the lengthwise movement of the racks to rotary movement of the pins.

7. The vehicle as recited in claim 6, wherein the converting means includes a ball joint at the end of each rack, and a steering rod having one end connected to the ball joint and another end connected to a respective pin.

* * * * *